United States Patent
Kim

(10) Patent No.: US 12,014,062 B2
(45) Date of Patent: Jun. 18, 2024

(54) STORAGE DEVICE AND OPERATING METHOD THEREOF

(71) Applicant: SK hynix Inc., Icheon-si (KR)

(72) Inventor: Hyun Tae Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 44 days.

(21) Appl. No.: 17/830,138

(22) Filed: Jun. 1, 2022

(65) Prior Publication Data

US 2023/0129727 A1 Apr. 27, 2023

(30) Foreign Application Priority Data

Oct. 27, 2021 (KR) .......................... 10-2021-0144557

(51) Int. Cl.
*G06F 3/06* (2006.01)

(52) U.S. Cl.
CPC ............ *G06F 3/064* (2013.01); *G06F 3/0604* (2013.01); *G06F 3/0634* (2013.01); *G06F 3/0659* (2013.01); *G06F 3/0673* (2013.01)

(58) Field of Classification Search
CPC ...... G06F 3/064; G06F 3/0604; G06F 3/0634; G06F 3/0659; G06F 3/0673; G06F 3/0679; G06F 3/0644; G11C 16/14; G11C 7/1006

See application file for complete search history.

(56) References Cited

U.S. PATENT DOCUMENTS

| | | | | |
|---|---|---|---|---|
| 2020/0118585 A1* | 4/2020 | Gerhart | ................ | G06F 3/0659 |
| 2021/0223962 A1* | 7/2021 | Esaka | .................. | G06F 3/0679 |
| 2021/0255803 A1* | 8/2021 | Kanno | ................. | G06F 3/0656 |
| 2022/0137817 A1* | 5/2022 | Kwak | .................. | G06F 3/0635 |
| | | | | 711/154 |
| 2022/0137858 A1* | 5/2022 | Lee | ........................ | G06F 3/0604 |
| | | | | 711/154 |
| 2022/0155957 A1* | 5/2022 | Byun | ..................... | G06F 3/0656 |
| 2022/0326847 A1* | 10/2022 | Otto | ........................ | G06F 3/0676 |
| 2022/0391089 A1* | 12/2022 | Muthiah | ................ | G06F 3/0608 |
| 2023/0014508 A1* | 1/2023 | Kanno | .................. | G11C 16/10 |
| 2023/0091792 A1* | 3/2023 | Kanno | .................. | G06F 3/0679 |
| | | | | 711/103 |

FOREIGN PATENT DOCUMENTS

KR 101365704 B1 2/2014

* cited by examiner

*Primary Examiner* — Tasnima Matin
(74) *Attorney, Agent, or Firm* — Perkins Coie LLP

(57) ABSTRACT

A storage device may include: a storage comprising a plurality of memory blocks of memory cells for storing data; and a controller in communication with the storage to control operations of the storage and configured, in response to a write request from an external device to write data to the storage, to generate a first zone including one or more memory blocks and sequentially store the data from a first storage position of the first zone, and further configured, in response to a modification request from the external device to modify the data stored in the first zone, to identify a target memory block corresponding to the modification request and rewrite data to the target memory block.

19 Claims, 10 Drawing Sheets

FIG. 3

ZMT(211)

| ID | ZSLBA | CAPA | ATTRIB | WP | ... |
|----|-------|------|--------|-------|-----|
| 1  | 0     | 4096 | C      | 4095  |     |
| 2  | 4096  | 4096 | C      | 8191  |     |
| 3  | 8192  | 2048 | C      | 10239 |     |
| 4  | 10240 | 1024 | O      | 10752 |     |
| ⋮  |       |      |        |       |     |

FIG. 4

| OPCODE | ID | NOSZ | NORST |
|--------|----|----|------|-------|

STORAGE DEVICE AND OPERATING METHOD THEREOF

PRIORITY CLAIM AND CROSS-REFERENCES TO RELATED APPLICATION

This patent document claims the priority and benefits of Korean application number 10-2021-0144557 filed on Oct. 27, 2021, in the Korean Intellectual Property Office, which is incorporated herein by reference in its entirety.

TECHNICAL FIELD

Various embodiments of the disclosed technology generally relate to a semiconductor integrated device, and more particularly, to a storage device and an operating method thereof.

BACKGROUND

A storage device is coupled to a host device, and performs a data input/output operation according to a request of the host device.

With the development of AI (Artificial Intelligence) and big data-related industry, research is being actively performed on a high-performance data center or personal computing device. The high-performance computing device may be implemented to drive a plurality of operating systems and/or application programs by using a hardware pool representing a storage device.

The storage device includes a nonvolatile memory device which secures a storage space and extends a lifetime through an internal management operation such as garbage collection. The internal management operation causes an operation of reading and programming data by using an available storage space, and the operation has an influence on the service quality of the system.

In order to exclude such an internal management operation, a new concept referred to as ZNS (Zoned Namespace) has been introduced, which divides a storage space in zones and sequentially writes data to the zones. Furthermore, research is being conducted on various methods for using the zones more efficiently.

SUMMARY

In an embodiment, a storage device may include: a storage comprising a plurality of memory blocks of memory cells for storing data; and a controller in communication with the storage to control operations of the storage and configured, in response to a write request from an external device to write data to the storage, to generate a first zone including one or more memory blocks and sequentially store the data from a first storage position of the first zone, and further configured, in response to a modification request from the external device to modify the data stored in the first zone, to identify a target memory block corresponding to the modification request and rewrite data to the target memory block.

In an embodiment, a storage device may include: a storage area divided into one or more zones, each zone including one or more memory blocks of memory cells for storing data; and a controller in communication with the storage area to control operations of the storage area and configured, in response to a request from an external device to modify data stored in a first zone, to divide the first zone into a plurality of sub zones, each sub zone corresponding to a memory block, identify a target group including one or more sub zones storing the data to be modified, and combine the one or more sub zones into the first zone after a completion of modifying the data.

In an embodiment, an operating method of operating a storage device including a plurality of memory blocks of memory cells for storing data and a controller that controls operations of the storage device, comprising: generating, by the controller, a first zone including one or more memory blocks in response to a write request received from an external device; storing, by the controller, data such that the data is sequentially stored from a first storage position of the first zone, and closing the first zone; identifying, by the controller, in response to a modification request from the external device to modify the data stored in the first zone, a target memory block corresponding to the modification request; and rewriting, by the controller, data to the target memory block.

BRIEF DESCRIPTION OF THE DRAWINGS

FIG. 3 is a configuration diagram illustrating a zone management table in accordance with an embodiment of the disclosed technology.

FIG. 4 is a configuration diagram illustrating a zone management command in accordance with an embodiment of the disclosed technology.

DETAILED DESCRIPTION

Hereafter, embodiments will be described in more detail with reference to the accompanying drawings.

Figure 1:
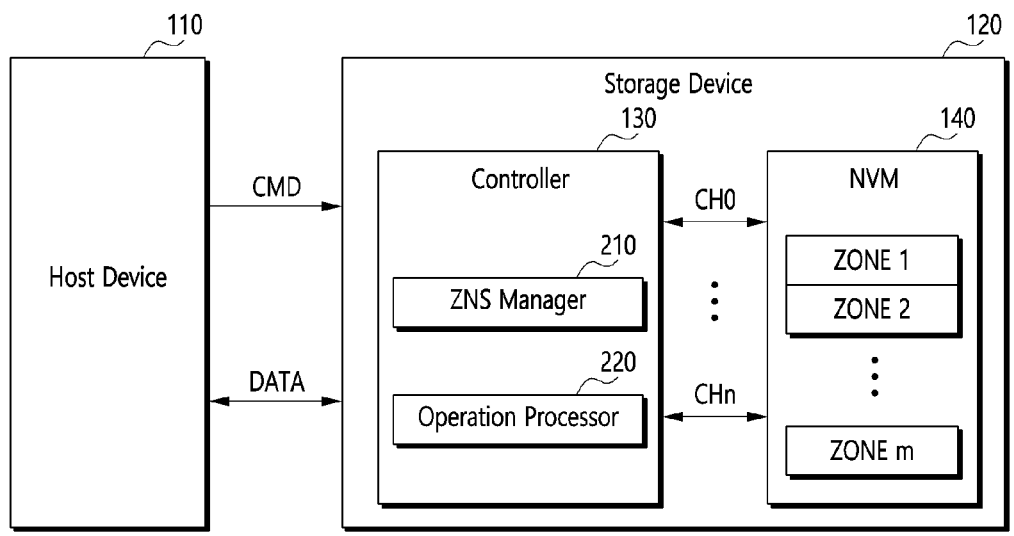
FIG. 1 is a configuration diagram illustrating a data processing system in accordance with an embodiment of the disclosed technology.

FIG. 1 is a configuration diagram illustrating a data processing system in accordance with an embodiment of the disclosed technology.

Referring to FIG. 1, a data processing system 100 may include a host device 110 and a storage device 120.

Examples of the host device 110 include portable electronic devices such as a mobile phone and MP3 player, personal electronic devices such as a laptop computer, desktop computer, game machine, TV and beam projector, or electronic devices such as a workstation or server for processing big data.

The storage device 120 is configured to input/output data DATA in response to a command CMD of an external such as the host device 110. The storage device 120 is configured to store data accessed by the host device 110. That is, the storage device 120 may be used as a main memory device or auxiliary memory device of the host device 110. The storage device 120 may be integrated in the form of a memory card or SSD (Solid State Drive) which is coupled to the host device 110 through various interfaces.

The storage device 120 may include a controller 130 and a storage (NVM) 140.

The controller 130 is configured to control the storage 140 in response to a request from the outside, e.g. the host device 110. For example, the controller 130 is configured to store data provided from the host device 110 in the storage 140 or provide data read from the storage 140 to the host device 110. For such an operation, the controller 130 is configured to control read, write and erase operations of the storage 140.

The storage 140 may include a nonvolatile memory device NVM. In an embodiment, the nonvolatile memory device may be configured as one or more of various types of nonvolatile memory devices such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase-change Random Access Memory) using chalcogenide alloys, or ReRAM (Resistive Random Access Memory) using transition metal oxide.

The storage 140 may be coupled to the controller 130 through one or more channels CH0 to CHn. The storage 140 may include a plurality of memory cells for storing data, where the memory cells are organized and grouped to form a plurality of pages each which includes different memory cells, and the pages are organized and grouped to form a plurality of blocks each including a plurality of pages. The page may be defined as a unit of data write or read operation, and the block may be defined as a unit of data erase operation.

At least some of memory cells constituting each page may each operate as an SLC (Single Level Cell) capable of storing 1-bit data therein or an MLC (Multi-Level Cell) capable of storing 2 or more-bit data therein.

The controller 130 may include a ZNS manager 210 and an operation processor 220.

The ZNS manager 210 may generate a plurality of zones in the storage 140 and write data to the generated zones, in response to a write request of the host device 110. The plurality of zones, Zone 1 to Zone m, may each include one or more blocks as sub zones, and have an equal or different size. The block may correspond to a minimum unit for erasing the storage 140. The storage 140 may have a storage space which is set to the plurality of zones Zone 1 to Zone m under control of the controller 130. In the respective zones, Zone 1 to Zone m, data are sequentially stored from a first storage position.

A zone may have an open state or closed state. The open state refers to a state indicating that a write/modification operation is being prepared or performed for writing new data or modifying data already written in the memory and the closed state refers to a state indicating that a write/modification operation has been completed. The zones in the open state and the closed state may be referred to as an open zone and a closed zone, respectively.

As the host device 110 transmits a write command including modification data to modify written data in order to change a part of data stored in a zone (closed zone) where a write operation has been completed, the ZNS manager 210 may search for a target block where modification target data is stored within the zone, reset (e.g. erase) the target block, and rewrite data to the target block.

The ZNS manager 210 in accordance with the present embodiment does not perform the reset and rewrite operations in units of zones when modifying data. In the implementations, the ZNS manager 210 performs the reset and rewrite operations in one or more sub zones in which the modification target data (e.g., the data that has been stored but to be modified) is included. The sub zone corresponds to a memory block which is the minimum unit that data in the storage 140 is erased. Thus, the ZNS manager 210 may minimize the volume of data which are erased and written when data are modified, thereby improving the operating speed of the data processing system 100.

In an embodiment, as the host device 110 transmits a write command including modification data in order to change a part of data stored in a zone (closed zone) where a write operation has been completed, the ZNS manager 210 may search for a target block to identify the target block where modification target data is stored within the zone, and reset (e.g. erase) the target block. In some implementations, the ZNS manager 210 may allocate at least one free block within the storage 140, which corresponds to the size of the modification data, and rewrite the modification data to the allocated free block.

The operation of rewriting data may indicate or include an operation of reading data of a target block, temporarily storing the data read from the target block, modifying the temporarily stored data according to the modification request transmitted from the host device 110, and writing the modified data to the target block or a newly allocated free block.

The operation processor 220 may control read, write and erase operations on the storage 140 under control of the controller 130.

Figure 2:
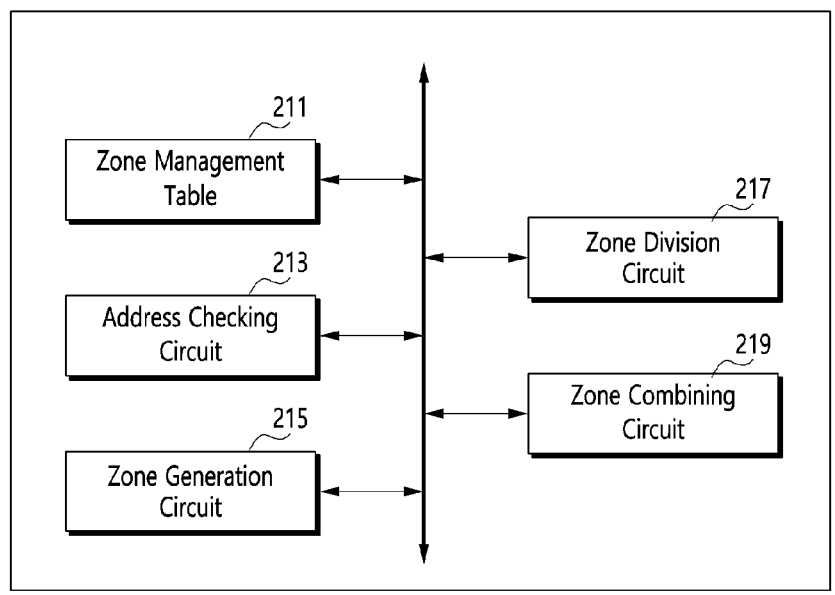
FIG. 2 is a configuration diagram illustrating a ZNS manager in accordance with an embodiment of the disclosed technology.

FIG. 2 is a configuration diagram illustrating the ZNS manager 210 in accordance with an embodiment of the disclosed technology.

Referring to FIG. 2, the ZNS manager 210 may include a zone management table 211, an address checking circuit 213, a zone generation circuit 215, a zone division circuit 217, and a zone combining circuit 219.

The zone management table (ZMT) 211 may store information on a zone which is generated according to a request of the host device 110.

FIG. 3 is a configuration diagram illustrating a zone management table in accordance with an embodiment of the disclosed technology.

As illustrated in FIG. 3, the zone management table ZMT may include an identifier (ID) field for each zone, a start logical address (ZSLBA) field, a capacity (CAPA) field, an attribute (ATTRIB) field, a write pointer (WP) field, or others. The zone management table 211 may be stored in the storage 140, and loaded to a working memory (not illustrated) within the controller 130 when the data processing system 100 is activated.

In the identifier (ID) field, information for identifying each zone is stored. A zone identifier ID may be transmitted from the host device 100, but the present embodiment is not limited thereto.

The start logical address (ZSLBA) field indicates the head logical block address of the corresponding zone. A physical address corresponding to the start logical address ZSLBA may be managed by the host device 110 or the controller 130.

The capacity (CAPA) field indicates the total number of logical blocks to which data can be written in the corresponding zone.

The attribute (ATTRIB) field indicates whether the corresponding zone is opened (O) or closed (C).

The write pointer (WP) field indicates the address of a logical block to which data can be written in the corresponding zone.

The address checking circuit 213 may determine, in response to the write request, whether the address (write address) of a logical block corresponding to a write request of the host device 110 is included in a closed zone. The write request of the host device 110 may include a write address, write data and the size of the write data, and may further include a zone identifier ID.

When the write address or the zone identifier ID is not included in the closed zone, the address checking circuit 213 may transmit a write address and the size of write data to the zone generation circuit 215, and request the zone generation circuit 215 to generate a new zone.

The zone generation circuit 215 generates a zone corresponding to the size of the write data and adds the generated zone to the zone management table 211, in response to the zone generation request of the address checking circuit 213. When the size of the write data is not included in the write request, the zone generation circuit 215 may generate a preset size of zone. In an embodiment, the zone generation circuit 215 may assign an identifier ID to the newly generated zone, and set the write logical address, transmitted from the host device 110, to the start logical address ZSLBA. Furthermore, the zone generation circuit 215 may set the capacity (CAPA) field according to the size of the generation zone, and define the attribute (ATTRIB) field as the opened state O. Furthermore, the zone generation circuit 215 may set a write pointer to point the first storage position of the generated zone. When a write operation on the corresponding zone is completed, the zone generation circuit 215 may change the state of the attribute (ATTRIB) field to the closed state C, and set the write pointer WP to point out the last data storage position.

The zone generation circuit 215 may assign a zone to each application program. For example, a plurality of application programs executed in the host device 110 may sequentially store data (files) in zones assigned thereto, respectively. In the respective zones, various types of data reflecting the characters of the corresponding application programs may be sequentially stored. The zones may be erased in units of zones or sub zones (blocks) constituting each of the zones.

When a write address included in a write request is included in a closed zone, the address checking circuit 213 may transmit the write address to the zone division circuit 217, and request the zone division circuit 217 to open a sub zone. When a write address is included in a closed zone, it may indicate that a write request of the host device 110 is a modification request for modifying data which has been already written. As described above, a zone may be configured as at least one sub zone, and modification target data may be data stored in one or more sub zone.

In response to the request of the address checking circuit 213, the zone division circuit 217 may change, based on the zone management table 211, the state of a modification target sub zone (e.g., a corresponding sub zone to the modification target data) within the zone from the closed state to the opens state, The modification target sub zone includes the write address corresponding to the write request and may include one or more sub zones. Specifically, the zone division circuit 217 detects the zone including the write address, and checks the number of sub zones constituting the corresponding zone on the basis of the capacity CAPA of the corresponding zone and the size of a unit block constituting the zone. Thus, when the position of the modification target sub zone is detected or identified, the zone division circuit 217 may transmit a reset command to the operation processor 220.

After the modification target sub zone is reset, the operation processor 220 may set the write pointer of the corresponding zone to point out a first storage position of the modification target zone. The operation processor 220 may rewrite data into the sub zone by referring to the write pointer, and change the state of the sub zone to the closed state.

When the state of the sub zone is changed to the closed state, the zone combining circuit 219 combines the corresponding zone. When a zone is combined, it may indicate that the zone is managed in units of zones instead of in units of subzones. In order to combine a zone, the operation processor 220 may set the write pointer WP to point out the last data storage position of the corresponding zone.

FIG. 4 is a configuration diagram illustrating a zone management command in accordance with an embodiment of the disclosed technology.

In order to modify a part of data stored in a zone, a target sub zone may be opened. In order to combine the zone again after modifying the data, a zone management command illustrated in FIG. 4 may be used.

Referring to FIG. 4, the zone management command may include an operation code (OPCODE) field, an identifier (ID) field, a sub zone count (NOSZ) field, and a sub zone number (NORST) field.

The operation code (OPCODE) field may be set to a first logic level (e.g. 0) when a zone is divided, and set to a second logic level (e.g. 1) when a zone is combined.

The identifier (ID) field is set to the identifier of a zone to be divided or combined.

The sub zone count (NOSZ) field is set to the number of sub zones constituting a zone in which data is to be modified. The number of sub zones, checked by the zone division circuit 217 during zone division, may be set to the sub zone count (NOSZ) field. When a zone is combined, the sub zone count (NOSZ) field is ignored.

The number of a sub zone to be reset is set to the sub zone number (NORST) field. When a zone is divided, the number of a sub zone to be modified is designated for the sub zone number (NORST) field. When a zone is combined, the sub zone number (NORST) field is ignored.

For example, when the zone management command is "01MX", an $X^{th}$ sub zone among M sub zones of a zone whose ID is 1 may be reset. When the zone management command is "11--", a zone whose ID is 1 may be combined.

Figure 5:
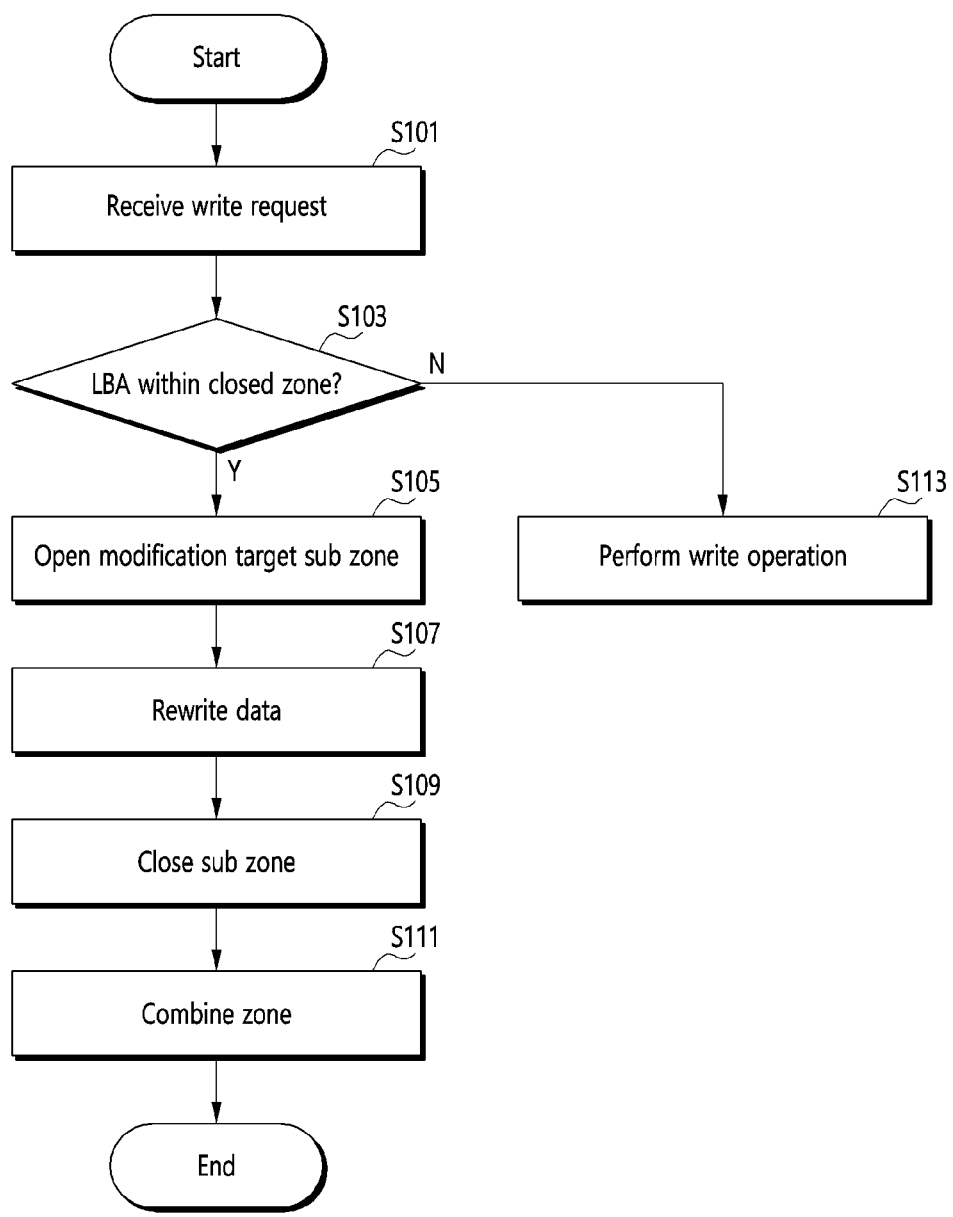
FIG. 5 is a flowchart for describing an operating method of a storage device in accordance with an embodiment of the disclosed technology.

FIG. 5 is a flowchart for describing an operating method of a storage device in accordance with an embodiment of the disclosed technology.

Referring to FIG. 5, a write request is received from the host device 110 at sept S101 and includes a write address, write data and the size of the write data. The write request can also include a zone identifier ID. The content of the write request may vary depending on implementations. Next in step S103, the controller 130 may determine whether the address (write address) of a logical block corresponding to the write request or the zone identifier ID is included in a closed zone.

When the write address or the zone identifier ID is included in the closed zone (Y in step S103) or when a write request for modifying data which has been already written is received, the controller 130 opens a target sub zone corresponding to a modification target in step S105. A specific process of opening a subzone will be described below with reference to FIG. 6. The opening of the target subzone may correspond to changing the state of the subzone from the closed state to the open state.

The controller 130 may rewrite data to the opened target sub zone in step S107. Thus, the controller 130 applies modification target data into data of the target sub zone, and then writes the data to the target sub zone.

When the rewrite operation is completed, the controller 130 closes the target sub zone in step S109, and combines the corresponding zone in step S111. For example, the controller 130 may set the write pointer WP to point out the last data storage position of the corresponding zone.

When the write address is not included in the closed zone (N in step S103), the controller 130 may generate a new zone and perform a write operation, in step S113. Information on the newly generated zone may be managed as the zone management table ZMT.

Figure 6:
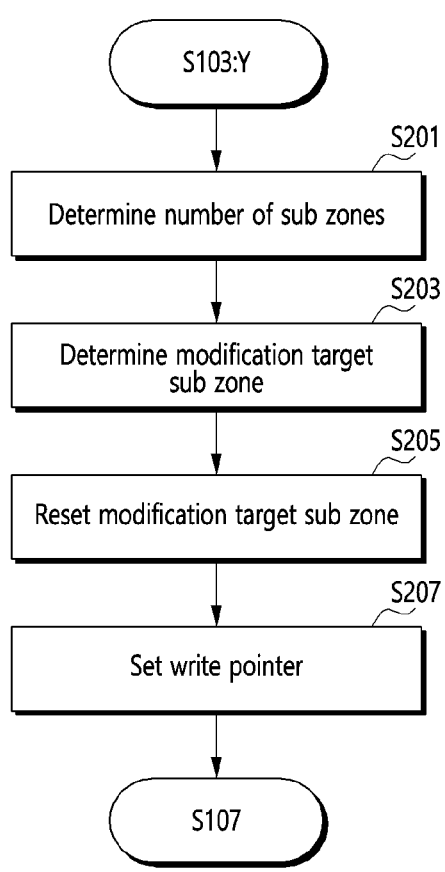
FIG. 6 is a diagram for describing an operating method of a storage device in accordance with an embodiment of the disclosed technology.

FIG. 6 is a diagram for describing an operating method of a storage device in accordance with an embodiment of the disclosed technology.

In order to open a target sub zone to which data is to be rewritten or modified, the controller 130 determines the number of sub zones constituting a zone including a write address on the basis of the capacity CAPA of the corresponding zone and the size of unit blocks constituting the zone, by referring to the zone management table ZMT, in step S201.

The controller 130 may determine the position of a sub zone including the write address, or determine to which sub zone in the corresponding zone the write request corresponds, in step S203. Then, the controller 130 may transmit a rest command through a zone management command, and reset the target sub zone, in step S205. The zone management command may have a format illustrated in FIG. 4.

After the target sub zone is reset, the controller 130 may set the write pointer of the corresponding zone to point out a first storage position of the modification target zone, in step S207.

Figure 7:
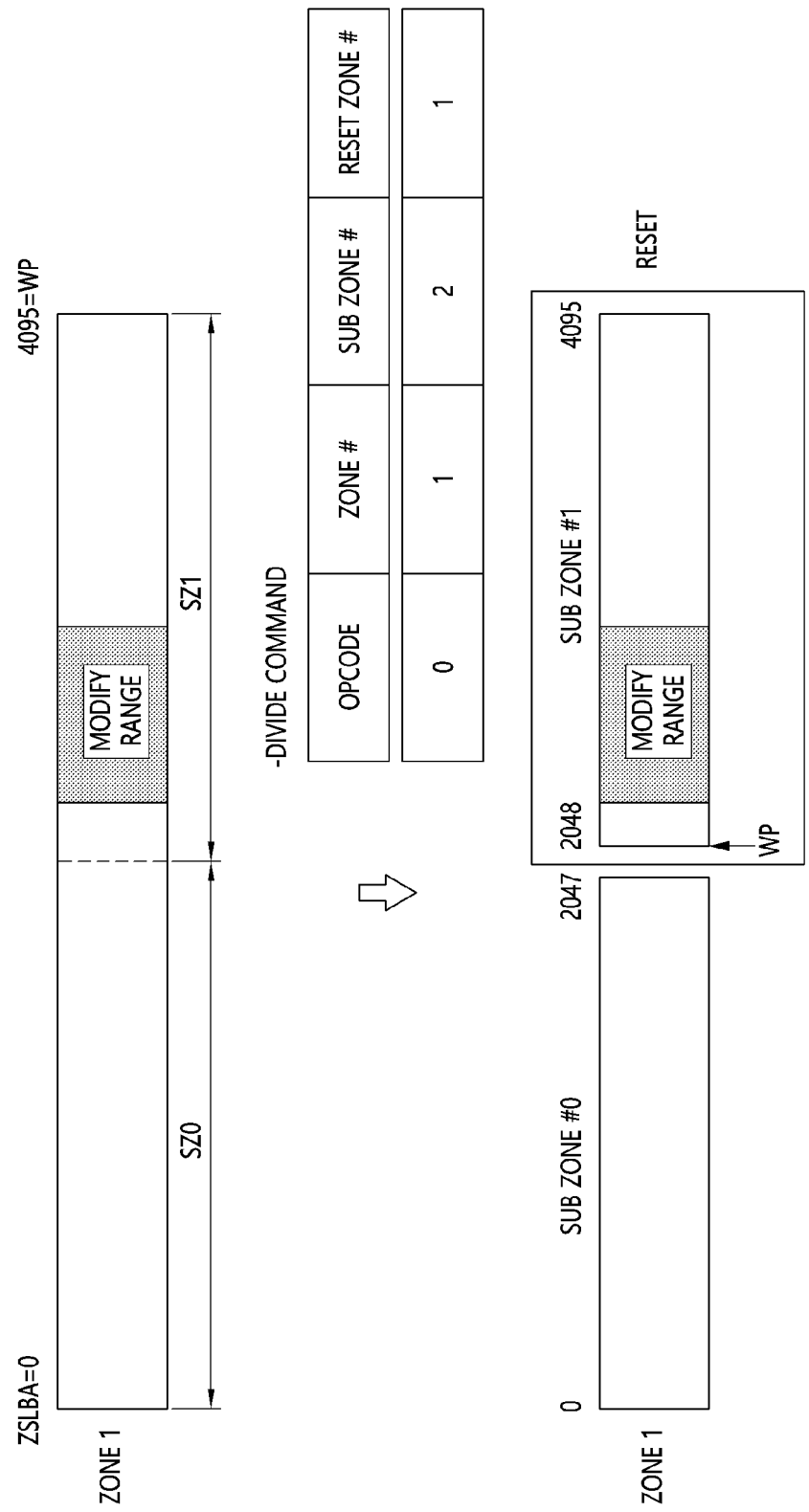
FIG. 7 is a conceptual view for describing a sub zone opening method in accordance with an embodiment of the disclosed technology.

FIG. 7 is a conceptual view for describing a sub zone opening method in accordance with an embodiment of the disclosed technology.

FIG. 7 is based on the assumption that a zone, Zone 1, is in the closed state and has an ID of 1. The zone, Zone1, is composed of two sub zones SZ0 and SZ1, the start address ZSLBA is 0, and the write pointer WP points out 4095.

As a write command for a logic address included in the logical address range (0 to 4095) of the zone, Zone1, is received, the controller 130 may determine the position of a target sub zone to be modified, and generate a zone management command.

As illustrated in FIG. 7, the zone management command may be generated as a divide command, and become "0121". That is, the zone, Zone 1, may be composed of two sub zones, and a first sub zone of the two sub zones may be divided according to the zone management command.

Thus, the zone, Zone1, is divided into a sub zone 0 Sub Zone #0 and a sub zone 1 Sub Zone #1, and the write pointer WP is set to point out the first storage position 2048 of the sub zone 1 Sub Zone #1.

When the sub zone Sub Zone #1 is reset according to the divide command, the controller 130 rewrites data to the sub zone 1 Sub Zone #1.

In order to rewrite data, the controller 130 may read data which have previously been stored in the sub zone 1 Sub Zone #1, temporarily store the read data, correct the temporarily stored data according to modification data of a modification range MODIFY RANGE, transmitted from the host device 110, and write the corrected data to the sub zone 1 Sub Zone #1.

Although not illustrated, when a modification request for modifying at least some data of the sub zone 1 Sub Zone #1 is received, the controller 130 may allocate a new free block and rewrite data to the new free block.

Figure 8:
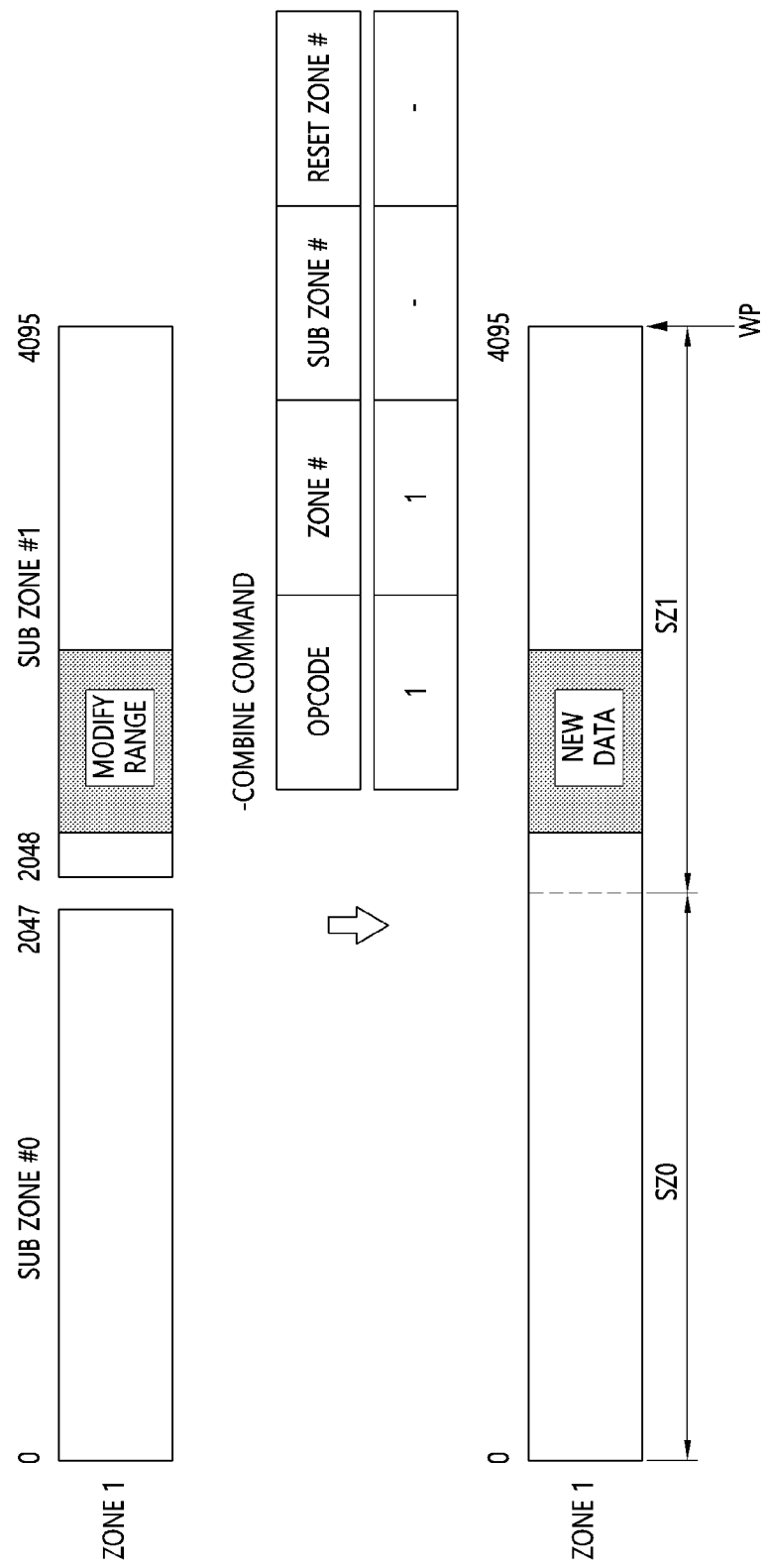
FIG. 8 is a conceptual view for describing a zone combining method in accordance with an embodiment of the disclosed technology.

FIG. 8 is a conceptual view for describing a zone combining method in accordance with an embodiment of the disclosed technology.

After the sub zone Sub Zone #1 is reset and the data is rewritten through the method illustrated in FIG. 7, the controller 130 may generate the zone management command as a combine command, and combine the corresponding zone. For example, the zone management command may be generated as the combine command, and become "11--". That is, the zone management command may instruct the controller 130 to combine the zone, Zone 1.

According to the combine command, the sub zone 0 Sub Zone #0 and the sub zone 1 Sub Zone #1, which constitute the zone, Zone 1, may be combined, and the write pointer WP may point out the storage position 4095 of the last data in the zone, Zone 1.

When modifying the data stored in the zone, the controller 130 may partially reset a modification target zone and rewrite data to the modification target zone, instead of resetting the entire zone and rewriting data, thereby improving the data processing speed and reducing the use frequency of the memory device.

Figure 9:
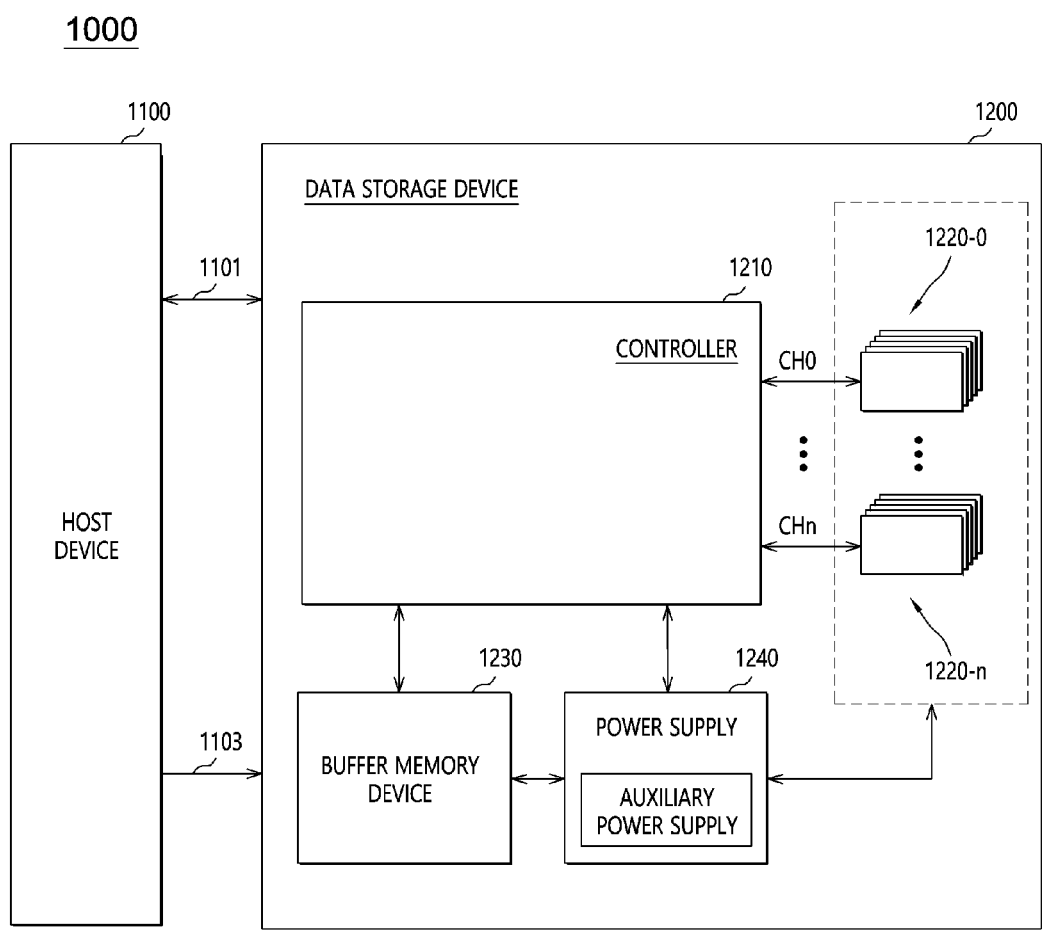
FIG. 9 is a diagram illustrating a data storage system in accordance with an embodiment of the disclosed technology.

FIG. 9 is a diagram illustrating a data storage system 1000, in accordance with an embodiment of the disclosed technology.

Referring to FIG. 9, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 130 shown in FIGS. 1 to 3.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
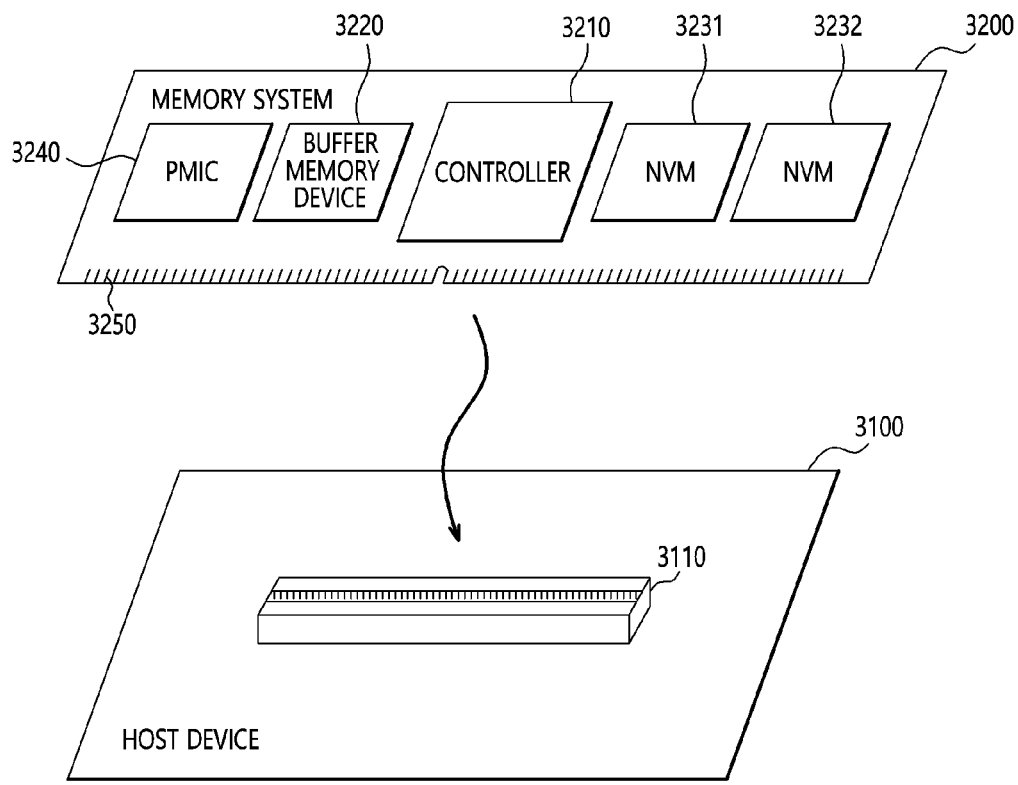
FIG. 10 and FIG. 11 are diagrams illustrating a data processing system in accordance with an embodiment of the disclosed technology.

FIG. 10 is a diagram illustrating a data processing system 3000, in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 130 shown in FIGS. 1에 3.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
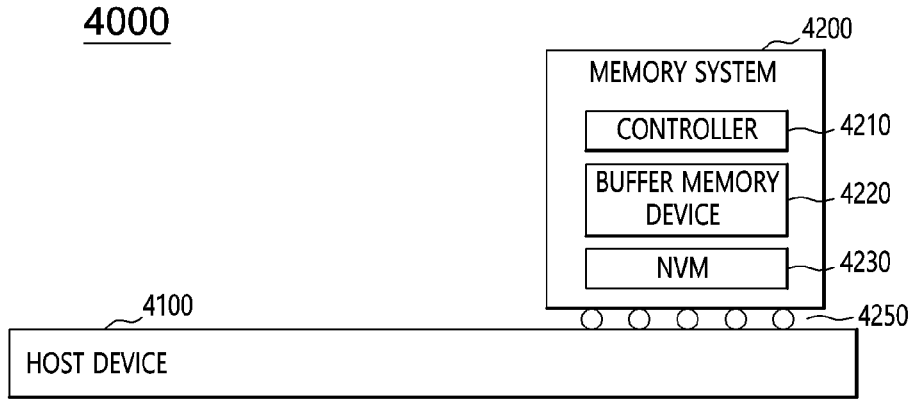

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 130 shown in FIGS. 1 to 3.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
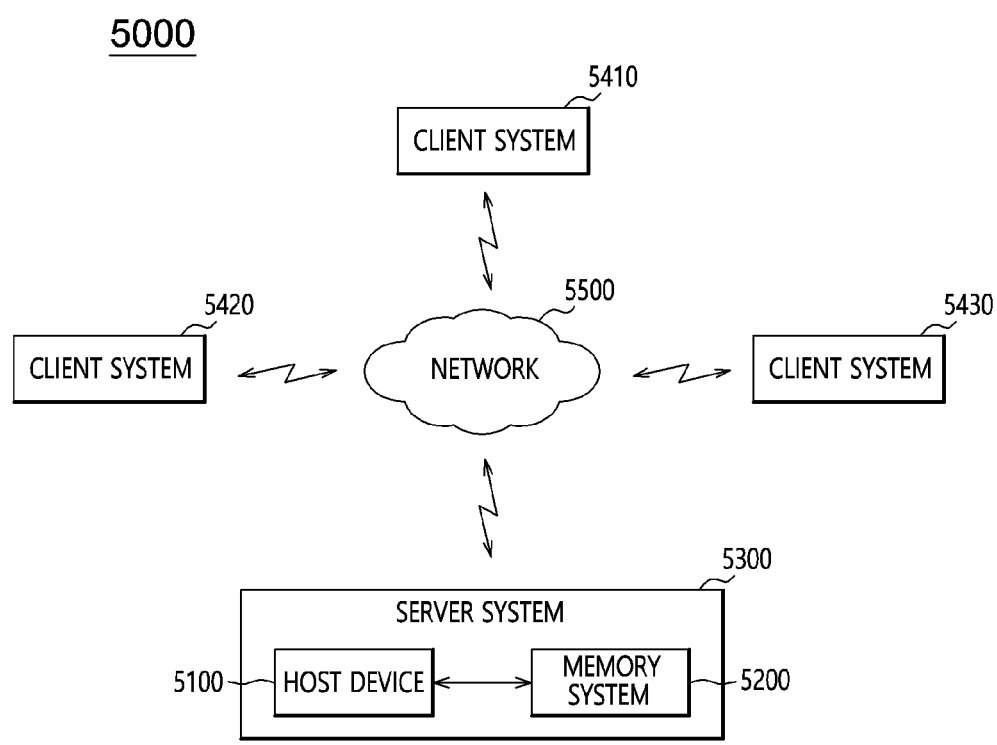
FIG. 12 is a diagram illustrating a network system including a data storage device in accordance with an embodiment of the disclosed technology.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the data storage device 120 shown in FIG. 1 to FIG. 3, the data storage device 1200 shown in FIG. 9, the memory system 3200 shown in FIG. 10, or the memory system 4200 shown in FIG. 11.

Figure 13:
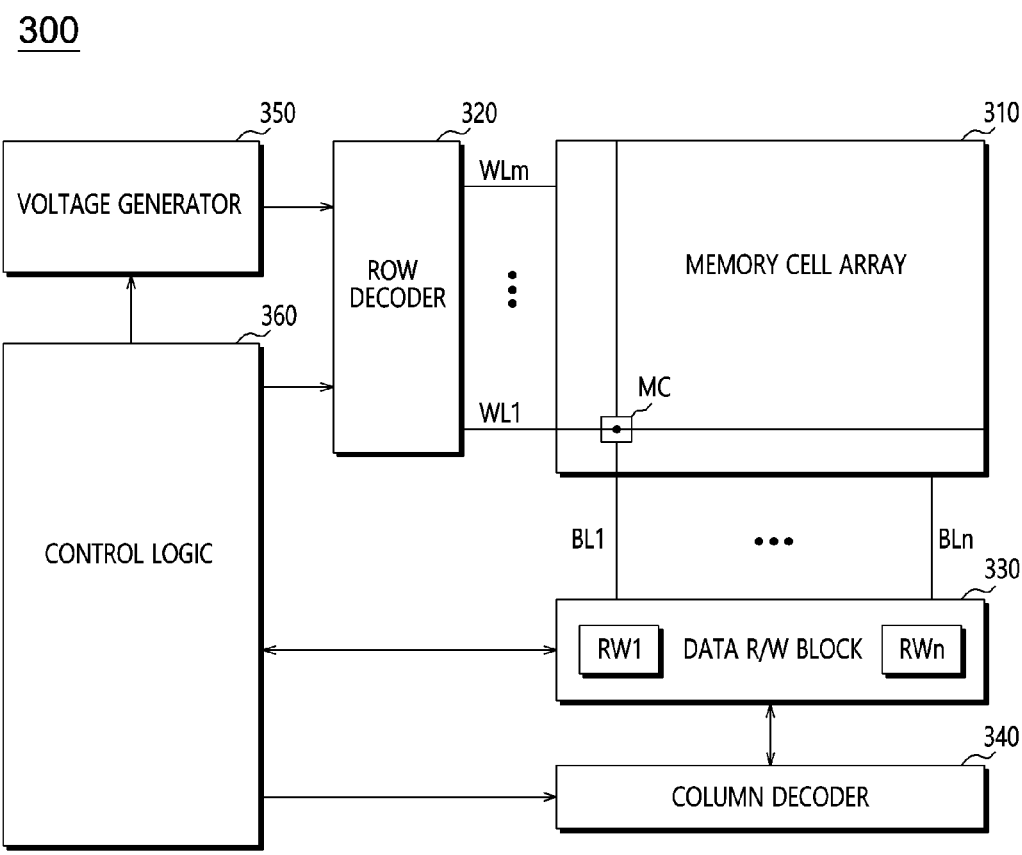
FIG. 13 is a block diagram illustrating a nonvolatile memory device included in a data storage device in accordance with an embodiment of the disclosed technology.

FIG. 13 is a block diagram illustrating a nonvolatile memory device 300 included in a data storage device, such as the data storage device 10, in accordance with an embodiment. Referring to FIG. 13, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood that variations and enhancements of the disclosed embodiments and other embodiments may be made based on what is disclosed and/or illustrated in this patent document.

What is claimed is:

1. A storage device comprising:
   a storage comprising a plurality of memory blocks of memory cells for storing data; and
   a controller in communication with the storage to control operations of the storage and configured, in response to a write request from an external device to write data to the storage, to generate a first zone including one or more memory blocks and sequentially store the data from a first storage position of the first zone, and further configured, in response to a modification request from the external device to modify the data stored in the first zone, to identify a target memory block corresponding to the modification request and rewrite data to the target memory block, wherein the controller further includes a zone division circuit configured, in response to the modification request for the first zone having a closed state, to divide the first zone into one or more sub-zones, each sub-zone corresponding to a memory block, and change a state of the target memory block from a closed state to an open state; and
   a zone combining circuit configured, in response to a completion of the modification request, to combine the one or more sub-zones.

2. The storage device according to claim 1, wherein the controller is further configured to reset the target memory block, and set a write pointer to point out a first storage position of the target memory block.

3. The storage device according to claim 1, wherein the controller is further configured to change a state of the target memory block from the open state to the closed state after a completion of the rewrite operation.

4. The storage device according to claim 1, wherein the controller is further configured to set a write pointer to point out a last data storage position of the first zone after a completion of the rewrite operation.

5. The storage device according to claim 1, wherein each memory block corresponding to a minimum unit that data is erased at one time.

6. The storage device according to claim 1, wherein the controller stores a zone management table including information, for each zone, an identifier (ID), a start logical address, a capacity indicating a total size of an area available for a write operation, a state indicating whether a corresponding zone is in the open state or the closed state, or a write pointer (WP) indicating an address of a particular position in a corresponding zone.

7. The storage device of claim 1, wherein the storage includes a nonvolatile memory device.

8. The storage device of claim 1, wherein the memory cells operate as a single level cell storing 1-bit data or a multi-level cell storing 2 or more-bit data.

9. The storage device of claim 1, wherein the write request includes a write address, write data, and a size of the write data.

10. The storage device of claim 1, wherein the controller is further configured to assign an identifier (ID) to the first zone.

11. A method of operating a storage device including a plurality of memory blocks of memory cells for storing data and a controller that controls operations of the storage device, comprising:
    generating, by the controller, a first zone including one or more memory blocks in response to a write request received from an external device;
    storing, by the controller, data such that the data is sequentially stored from a first storage position of the first zone, and closing the first zone;
    dividing, by the controller, in response to a modification request from the external device to modify the data stored in the first zone, the first zone into one or more sub-zones, each sub-zone corresponding to a memory block, to identify a target memory block;
    changing, by the controller, a state of the target memory block from a closed state to an open state;
    rewriting, by the controller, data to the target memory block; and
    combining, by the controller, in response to a completion of the modification request, the one or more sub-zones.

12. The method according to claim 11, wherein the changing of the state of the target memory block comprises:
    resetting the target memory block; and
    setting a write pointer to point out a first storage position of the target memory block.

13. The method according to claim 11, further comprising, after the rewriting of the data: changing the state of the target memory block to the closed state.

14. The method according to claim 11, further comprising, after the rewriting of the data: setting a write pointer to point out a last data storage position of the first zone.

15. The method of claim 11, wherein the storage device includes a nonvolatile memory device.

16. The method of claim 11, wherein the memory cells operate as a single level cell storing 1-bit data or a multi-level cell storing 2 or more-bit data.

17. The method of claim 11, wherein the write request includes a write address, write data, and a size of the write data.

18. The method of claim 11, further comprising, after the generating of the first zone, assigning an identifier (ID) to the first zone.

19. The operating method of claim 11, wherein each memory block corresponding to a minimum unit that data is erased at one time.

* * * * *